(12) United States Patent
Yuan et al.

(10) Patent No.: US 10,282,934 B2
(45) Date of Patent: May 7, 2019

(54) LEASING TERMINAL OF MOBILE POWER SUPPLY (71) Applicant: SHENZHEN LAIDIAN TECHNOLOGY CO., LTD., Shenzhen, Guangdong (CN)

(72) Inventors: Bingsong Yuan, Guangdong (CN); Weige Yu, Guangdong (CN); Changming Luo, Guangdong (CN)

(73) Assignee: SHENZHEN LAIDIAN TECHNOLOGY CO., LTD., Shenzhen, Guangdong (CN)

(*) Notice: Subject to any disclaimer, the term of this patent is extended or adjusted under 35 U.S.C. 154(b) by 152 days.

(21) Appl. No.: 15/546,642

(22) PCT Filed: Feb. 14, 2015

(86) PCT No.: PCT/CN2015/073076
§ 371 (c)(1),
(2) Date: Jul. 26, 2017

(87) PCT Pub. No.: WO2016/127418
PCT Pub. Date: Aug. 18, 2016

(65) Prior Publication Data
US 2018/0025573 A1 Jan. 25, 2018

(30) Foreign Application Priority Data
Feb. 12, 2015 (WO) .............. PCT/CN2015/072904

(51) Int. Cl.
G07F 7/00 (2006.01)
G07F 7/06 (2006.01)
(Continued)

(52) U.S. Cl.
CPC .......... *G07F 15/006* (2013.01); *G06Q 20/18* (2013.01); *G06Q 30/0645* (2013.01);
(Continued)

(58) Field of Classification Search
CPC . H04W 52/146; H04W 52/325; H04W 88/02; H04W 12/08; H04W 24/10;
(Continued)

(56) References Cited

U.S. PATENT DOCUMENTS 6,498,457 B1 12/2002 Tsuboi
2014/0194092 A1* 7/2014 Wanstedt .............. G06Q 50/10
455/406
(Continued)

FOREIGN PATENT DOCUMENTS

CN 1277414 A 12/2000
CN 1991896 A 7/2007
(Continued)

OTHER PUBLICATIONS

EP Search Report from EP15881580.3 dated Jun. 28, 2018, 8 pgs.
(Continued)

*Primary Examiner* — Kwasi Karikari (57) ABSTRACT

A leasing terminal of a mobile power supply comprises a CPU, a network communication module and a main control MCU which are respectively connected to the CPU, and at least one charging module, at least one charging cabinet motion drive motor and at least one mobile power supply information reading module which are respectively connected to the main control MCU; and each charging cabinet corresponds to one charging module, one charging cabinet motion drive motor and one mobile power supply information reading module. By means of the present invention, when a user is outside, a mobile power supply can be leased from a leasing terminal of the mobile power supply in a self-service manner, thereby providing the flexible charging service to the user.

14 Claims, 3 Drawing Sheets

(51) Int. Cl.
  *G07F 15/00* (2006.01)
  *G07F 17/00* (2006.01)
  *G06Q 20/18* (2012.01)
  *G06Q 30/06* (2012.01)
  *G06Q 50/06* (2012.01)
  *H02J 7/00* (2006.01)
  *G07F 17/12* (2006.01)
  *H04M 9/08* (2006.01)

(52) U.S. Cl.
  CPC ............... *G06Q 50/06* (2013.01); *G07F 7/00* (2013.01); *G07F 7/06* (2013.01); *G07F 17/00* (2013.01); *G07F 17/0042* (2013.01); *G07F 17/12* (2013.01); *H02J 7/0042* (2013.01); *H04M 9/08* (2013.01); *G07F 15/00* (2013.01); *H02J 7/00* (2013.01)

(58) Field of Classification Search
  CPC ... H04W 4/80; H04W 52/367; H04W 52/365; H04W 76/10; H04W 84/12; H04W 8/24; H04W 4/24; H04W 52/383; H04W 4/60; H04W 52/0283; H04W 52/04; H04W 52/34; H04W 56/0095; H04W 72/04; H04W 76/16; H04L 12/1407; H04L 1/0026; H04L 12/2898; H04L 65/1083
  See application file for complete search history.

(56) References Cited

U.S. PATENT DOCUMENTS

| | | |
|---|---|---|
| 2014/0279576 A1 | 9/2014 | Luke |
| 2014/0368156 A1 | 12/2014 | Aloe |
| 2015/0118962 A1* | 4/2015 | Chu .................. H04B 5/0056 455/41.1 |
| 2015/0288317 A1* | 10/2015 | Huang .................. H02S 10/10 307/26 |

FOREIGN PATENT DOCUMENTS

| | | |
|---|---|---|
| CN | 102831720 A | 12/2012 |
| CN | 203151138 U | 8/2013 |
| CN | 103646470 A | 3/2014 |
| CN | 203644131 U | 6/2014 |
| CN | 104603849 A | 5/2015 |
| CN | 204557649 U | 8/2015 |
| EP | 0773519 A2 | 5/1997 |
| EP | 0905962 A1 | 3/1999 |
| EP | 2428939 A1 | 3/2012 |
| JP | 2004231024 A | 8/2004 |
| JP | 2012119324 A | 6/2012 |
| JP | 2013255415 A | 12/2013 |
| JP | 2014241694 A | 12/2014 |
| JP | 2014533480 A | 12/2014 |
| WO | 2013142154 A1 | 9/2013 |
| WO | 2014062846 A2 | 4/2014 |

OTHER PUBLICATIONS

Singapore Search Report from application 11201705445U dated Jun. 29, 2018, 10 pgs.

International Search Report and Written Opinion dated Nov. 20, 2015 for PCT/CN2015/073076.

Japanese Office Action and Notice of Reasons for Refusal for Japanese patent application No. 2017-560849, dated Dec. 27, 2018, 14 pages.

* cited by examiner

LEASING TERMINAL OF MOBILE POWER SUPPLY

TECHNICAL FIELD

The present invention belongs to the field of electrics, and in particular to a leasing terminal of a mobile power supply.

BACKGROUND ART

With the improvement of the standard of living, cell phones, IPADs and notebook computers have become necessary electronic products of business people and university students, especially cell phone, which is an electronic product that everyone will carry. As functions of cell phone applications are diversified, power consumption is increased gradually, and consequently, a user's cell phone may run out of power only in several hours. For example, while the cell phone is fully charged when the user leaves home in the morning, it runs out of power by noon, and he can only wait until going back to the office or home to charge the cell phone. This has serious effects on the user's work and life.

SUMMARY OF THE INVENTION

The object of the present invention is to provide a leasing terminal of a mobile power supply, which aims to solve the problem that it is impossible to provide flexible charging service to an electronic product when the user is outside in the prior art.

The present invention provides a leasing terminal of a mobile power supply. The leasing terminal includes a CPU, a network communication module and a main control MCU which are respectively connected to the CPU, and at least one charging module, at least one charging cabinet motion drive motor and at least one mobile power supply information reading module which are respectively connected to the main control MCU; each charging cabinet corresponds to one charging module, one charging cabinet motion drive motor and one mobile power supply information reading module;

the CPU is used for controlling the main control MCU to generate a corresponding leasing control instruction according to a leasing instruction received by the network communication module from a cloud server, and is also used for controlling the main control MCU to generate a charging management control instruction, and is also used for receiving information obtained by the main control MCU and feeding the information back to the cloud server via the network communication module;

the main control MCU is used for generating the charging management control instruction for controlling the charging module to charge the mobile power supply in the charging cabinet, and is also used for generating the leasing control instruction to control forward and reverse rotations of the charging cabinet motion drive motor, and is also used for acquiring information relevant to the mobile power supply from the mobile power supply information reading module;

the charging module is used for charging the mobile power supply in the charging cabinet;

the charging cabinet motion drive motor is used for transferring the mobile power supply into or out of the charging cabinet;

the mobile power supply information reading module is used for reading the information relevant to the mobile power supply connected thereto.

Further, the leasing terminal also includes at least one charging cabinet door drive motor connected with the main control MCU, each charging cabinet corresponding to one charging cabinet door drive motor;

the main control MCU is also used for generating a leasing control instruction to control the forward and reverse rotations of the charging cabinet door drive motor;

the charging cabinet door drive motor is used for opening and closing the charging cabinet door.

Further, the leasing terminal also includes at least one charging cabinet door sensor connected with the main control MCU, each charging cabinet corresponding to one charging cabinet door sensor;

the charging cabinet door sensor is used for judging an open/close state of the charging cabinet door;

the main control MCU is also used for acquiring information of the open/close state of the charging cabinet door from the charging cabinet door sensor.

Further, the leasing terminal also includes at least one first photoelectric sensor connected to the main control MCU, each charging cabinet corresponding to one first photoelectric sensor;

the first photoelectric sensor is used for judging whether or not the mobile power supply is in the charging cabinet;

the main control MCU is also used for acquiring, from the first photoelectric sensor, information about whether the mobile power supply is in the charging cabinet;

or, the leasing terminal also includes two first photoelectric sensors connected with the main control MCU, each charging cabinet corresponding to two first photoelectric sensors, wherein one first photoelectric sensor is used for judging whether or not the mobile power supply is located at the charging cabinet door, and the other first photoelectric sensor is used for judging whether or not the mobile power supply has been taken away; the main control MCU is also used for obtaining, from the two first photoelectric sensors, information about whether the mobile power supply is located at the charging cabinet door and information about whether the mobile power supply has been taken away.

Further, the leasing terminal also includes at least one in-position detection sensor connected to the main control MCU, each charging cabinet corresponding to one in-position detection sensor;

the in-position detection sensor is used for judging whether the mobile power supply has been transferred to the charging position;

the main control MCU is also used for acquiring, from the in-position detection sensor, information about whether the mobile power supply has been transferred to the charging position.

Furthermore, the leasing terminal also includes an input module connected with the CPU, the input module is used for inputting a return instruction.

Further, the leasing terminal also includes an output module connected with the CPU, the output module is used for outputting an identification number and/or prompt information of the leasing terminal of the mobile power supply.

Further, the leasing terminal also includes a recycling storehouse control module connected with the CPU, and a second photoelectric sensor and a recycling storehouse door drive motor which are respectively connected to the recycling storehouse control module;

the recycling storehouse control module is used for controlling forward and reverse rotations of the recycling storehouse door drive motor, and is also used for acquiring, from the second photoelectric sensor, information about whether the mobile power supply has been put into the recycling storehouse;

the recycling storehouse door drive motor is used for opening or closing the recycling storehouse door;

the second photoelectric sensor is used for judging whether the mobile power supply has been put into the recycling storehouse;

the CPU is also used for transmitting a storehouse opening or closing instruction to the recycling storehouse control module, and is also used for receiving information obtained by the recycling storehouse control model from the second photoelectric sensor and feeding back the information to the cloud server via the network communication module.

Further, the leasing terminal also includes at least one sales line control module connected with the CPU, and a third photoelectric sensor and a sales line control motor which are respectively connected to the sales line control module;

the sales line control module is used for controlling forward and reverse rotations of the sales line control motor, and is also used for obtaining, from the third photoelectric sensor, information about whether a data line stretches out;

the third photoelectric sensor is used for judging whether or not the data lines stretches out;

the CPU is also used for transmitting a sales line instruction to the sales line control module, and is also used for receiving information obtained by the sales line control module from the third photoelectric sensor and feeding back the information to the cloud server via the network communication module.

In the present invention, since the leasing terminal of the mobile power supply includes a CPU, a network communication module and a main control MCU which are respectively connected to the CPU, and at least one charging module, at least one charging cabinet motion drive motor and at least one mobile power supply information reading module which are respectively connected to the main control MCU, wherein each charging cabinet corresponds to one charging module, one charging cabinet motion drive motor and one mobile power supply information reading module. Therefore, when a user is outside, a mobile power supply can be leased from the leasing terminal of the mobile power supply in a self-service manner, thereby providing the flexible charging service to the user.

DETAILED DESCRIPTION OF THE EMBODIMENTS

In order to make the purpose, technical solution and advantageous effect of the present invention clearer and more understandable, the present invention will be further described in detail with reference to the accompanying drawings and embodiments. It should be understood that the specific embodiments described herein are only used for explaining the present invention, rather than limiting the present invention.

In order to describe the technical solution of the present invention, the following specific embodiments are presented for the description.

Embodiment 1

Figure 1:
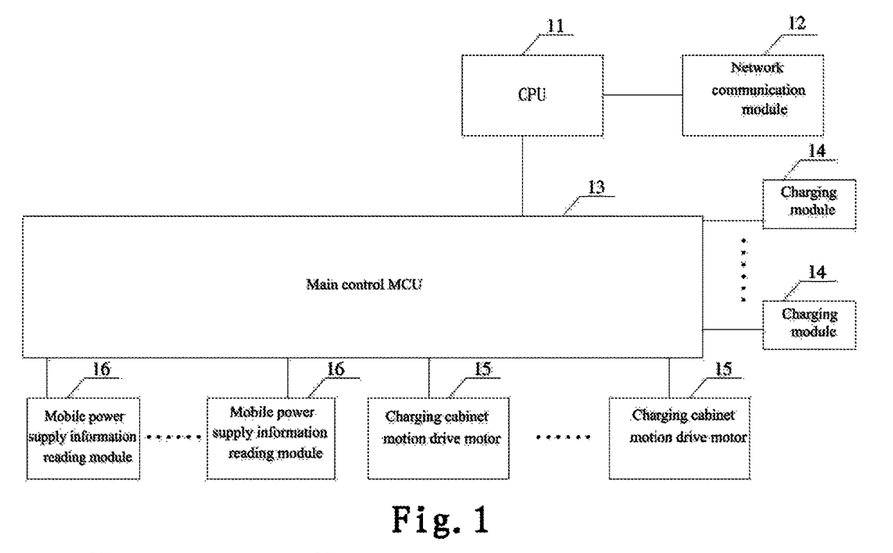
FIG. 1 is a structural diagram of a leasing terminal of a mobile power supply provided in embodiment 1 of the present invention.

With reference to FIG. 1, the leasing terminal of the mobile power supply provided in embodiment 1 of the present invention includes a CPU 11, a network communication module 12 and a main control MCU 13 which are respectively connected to the CPU 11, and at least one charging module 14, at least one charging cabinet motion drive motor 15 and at least one mobile power supply information reading module 16 which are respectively connected to the main control MCU 13.

Wherein, the charging modules 14, charging cabinet motion drive motors 15 and mobile power supply information reading modules 16 are of equal number. Each charging cabinet corresponds to one charging module 14, one charging cabinet motion drive motor 15 and one mobile power supply information reading module 16. The charging cabinet motion drive motor 15 may be a stepper motor which can control the motor rotational speed and distance precisely by means of software control. This may reduce mechanical impact, reduce failure and lengthen service life.

The operating principle of the leasing terminal of the mobile power supply provided in embodiment 1 of the present invention is as follows.

The CPU 11 is used for controlling the main control MCU 13 to generate a corresponding leasing control instruction according to a leasing instruction received by the network communication module 12 from a cloud server. The CPU 11 is also used for controlling the main control MCU 13 to generate a charging management control instruction. The CPU 11 is also used for receiving information obtained by the main control MCU 13 and feeding the information back to the cloud server via the network communication module 12. Wherein, the leasing instruction includes a borrow instruction and/or a return instruction. The main control MCU 13 is used for generating a charging management control instruction for controlling the charging module 14 to charge the mobile power supply in the charging cabinet, and is also used for generating a leasing control instruction to control forward and reverse rotations of the charging cabinet motion drive motor 15, and is also used for acquiring information relevant to the mobile power supply from the mobile power supply information reading module 16. The charging mobile 14 is used for charging the mobile power supply in the charging cabinet. The charging cabinet motion drive motor 15 is used for transferring the mobile power supply in or out of the charging cabinet. The mobile power supply information reading module 16 is used for reading information relevant to the mobile power supply connected thereto, such as electrical quantity and identification number, etc. of the mobile power supply.

For example, when a user obtains, from an APP of a cell phone, an identification number of a leasing terminal of a mobile power supply and transmits an instruction of borrowing a mobile power supply from the leasing terminal of the mobile power supply to the cloud server, the cloud server transmits an instruction of borrowing the mobile power supply to the leasing terminal of the mobile power supply, and the network communication module receives the instruction of borrowing the mobile power supply from the cloud server, and the CPU controls the main control MCU to generate a corresponding control instruction of borrowing the mobile power supply according to the instruction of borrowing the mobile power supply. After the main control MCU generates a corresponding control instruction of borrowing the mobile power supply, the main control MCU controls charging cabinet motion drive motor(s) corresponded to one or more of charging cabinets having mobile power supply(s) to rotate forward (the precondition of controlling charging cabinet motion drive motors corresponded to multiple charging cabinets having mobile power supplies to rotate forward is: when there are multiple mobile power supplies to be borrowed). The charging cabinet motion drive motor(s) transfer(s) the mobile power supply(s) out of the charging cabinet(s) to charge (an) electronic product(s), such as (a) cell phone(s), of the user(s). Before a mobile power supply is transferred out of the charging cabinet, the main control MCU acquires information relevant to the mobile power supply, such as an identification number of the mobile power supply, from the mobile power supply information reading module, and the CPU receives the information obtained by the main control MCU and feeds it back to the cloud server via the network communication module. Thereafter, the cloud server feeds the information back to the APP of the cell phone to prompt the user for the information of the borrowed mobile terminal.

When a user obtains, from an APP of the cell phone, an identification number of a leasing terminal of a mobile power supply and transmits an instruction of returning the mobile power supply to the leasing terminal of the mobile power supply to the cloud server, the cloud server transmits the instruction of returning the mobile power supply to the leasing terminal of the mobile power supply, and the network communication module receives the instruction of returning the mobile power supply from the cloud server, and the CPU controls the main control MCU to generate a corresponding control instruction of returning the mobile power supply according to the instruction of returning the mobile power supply. After the main control MCU generates a corresponding control instruction of returning the mobile power supply, the main control MCU controls charging cabinet motion drive motor(s) corresponded to one or more of charging cabinets not having mobile power supplies to rotate reversely (the precondition of controlling charging cabinet motion drive motors corresponded to multiple charging cabinet not having mobile power supplies to rotate reversely is: when there are multiple mobile power supplies to be returned). The charging cabinet motion drive motor(s) transfer(s) the mobile power supply(s) into the charging cabinet(s). In addition, when returning a mobile power supply, the return instruction may not be transmitted via the cloud server, but the return instruction may be directly input on the leasing terminal of the mobile power supply, and then the CPU executes corresponding operations, see embodiment 4 for the detail. After the mobile power supply is transferred into the charging cabinet, the main control MCU acquires information relevant to the mobile power supply, such as an identification number of the mobile power supply, from the mobile power supply information reading module, and the CPU receives the information obtained by the main control MCU and feeds it back to the cloud server via the network communication module. Thereafter, the cloud server feeds the information back to the APP of the cell phone to prompt the user for the information of the returned mobile terminal.

In embodiment 1 of the present invention, the leasing terminal of the mobile power supply includes a CPU, a network communication module and a main control MCU which are respectively connected to the CPU, and at least one charging module, at least one charging cabinet motion drive motor and at least one mobile power supply information reading module which are respectively connected to the main control MCU, wherein each charging cabinet corresponds to one charging module, one charging cabinet motion drive motor and one mobile power supply information reading module. Therefore, when a user is outside, a mobile power supply can be leased from the leasing terminal of the mobile power supply in a self-service manner, thereby providing the flexible charging service to the user.

Embodiment 2

Figure 2:
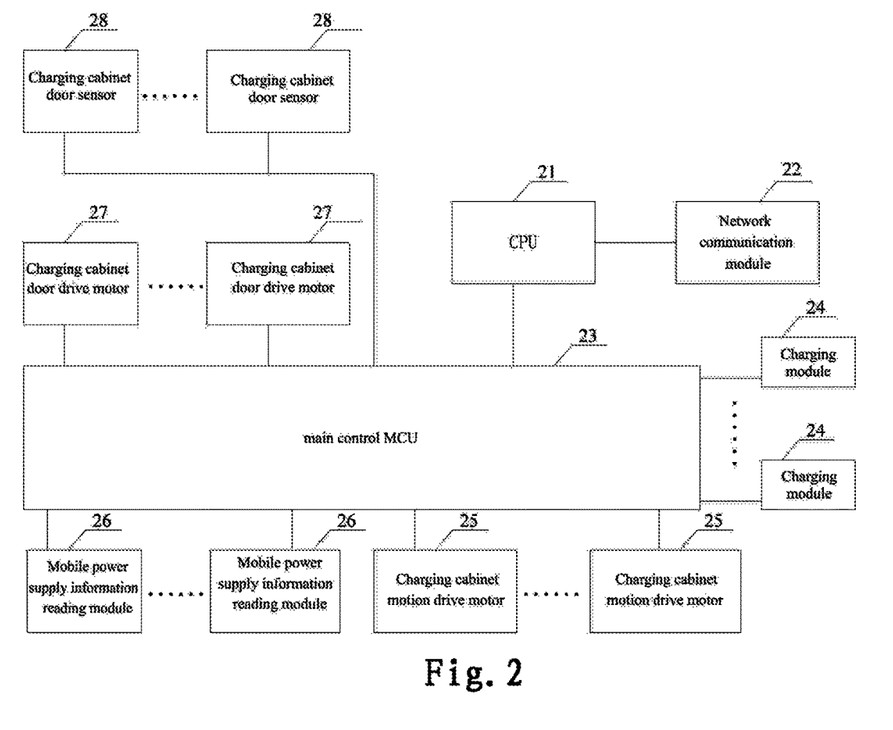
FIG. 2 is a structural diagram of a leasing terminal of a mobile power supply provided in embodiment 2 of the present invention.

With reference to FIG. 2, the leasing terminal of the mobile power supply provided in embodiment 2 of the present invention includes a CPU 21, a network communication module 22 and a main control MCU 23 which are respectively connected to the CPU 21, and at least one charging module 24, at least one charging cabinet motion drive motor 25, at least one mobile power supply information reading module 26, at least one charging cabinet door drive motor 27 and at least one charging cabinet door sensor 28 which are respectively connected to the main control MCU 23.

Wherein, the charging modules 24, charging cabinet motion drive motors 25, mobile power supply information reading modules 26, charging cabinet door drive motors 27 and charging cabinet door sensors 28 are of equal number. Each charging cabinet corresponds to one charging module 24, one charging cabinet motion drive motor 25, one mobile power supply information reading module 26, one charging cabinet door drive motor 27 and one charging cabinet door sensor 28. The charging cabinet motion drive motor 25 and charging cabinet door drive motor 27 may be stepper motors which can control the motor rotational speed and distance precisely by means of software control. This may reduce mechanical impact, reduce failure and lengthen service life.

The leasing terminal of the mobile power supply provided in embodiment 2 of the present invention differs from the leasing terminal of the mobile power supply provided in embodiment 1 of the present invention in that the charging cabinet of the leasing terminal of the mobile power supply provided in embodiment 2 of the present invention also includes a charging cabinet door. Therefore, the circuit structure also includes a charging cabinet door drive motor 27 and a charging cabinet door sensor 28. In the leasing terminal of the mobile power supply provided in embodiment 2 of the present invention, the main control MCU 23 is used for generating a charging management control instruction for controlling the charging module 24 to charge the mobile power supply in the charging cabinet, and is also used for generating a leasing control instruction to control forward and reverse rotations of the charging cabinet motion drive motor 25 and the charging cabinet door drive motor 27, and is also used for acquiring information relevant to the mobile power supply from the mobile power supply information reading module 26, and is also used for acquiring information of open/close state of the charging cabinet door from the charging cabinet door sensor 28; the charging cabinet door drive motor 27 is used for opening and closing the charging cabinet door; the charging cabinet door sensor 28 is used for judging the open/close state of the charging cabinet door.

When the user wants to borrow a mobile power supply, the main control MCU generates a corresponding control instruction of borrowing the mobile power supply, then the main control MCU controls charging cabinet door drive motor(s) 27 corresponded to one or more of charging cabinets having mobile power supply(s) to rotate forward (the precondition of controlling the charging cabinet door drive motors corresponded to multiple charging cabinets having mobile power supplies to rotate forward is: when there are multiple mobile power supplies to be borrowed). The charging cabinet drive motor 27 opens the charging cabinet door, and meanwhile the charging cabinet door sensor 28 judges the open/close state of the charging cabinet door. If the charging cabinet door is opened normally, the charging cabinet motion drive motor will be controlled to rotate forward, and the charging cabinet motion drive motor will transfer the mobile power supply from the charging cabinet so as to charge an electronic product, such as a cell phone, for the user. At last, the charging cabinet door drive motor 27 is controlled to rotate reversely. The charging cabinet door drive motor 27 closes the charging cabinet door. At this time, the charging cabinet door sensor 28 judges an open/close state of the charging cabinet door. If the charging cabinet door is not closed successfully, the terminal will repeat the step of closing until the charging cabinet door is closed.

When the user wants to return a mobile power supply, the main control MCU generates a corresponding control instruction of returning the mobile power supply, then the main control MCU controls charging cabinet door drive motor(s) 27 corresponded to one or more of charging cabinets not having mobile power supplies to rotate forward (the precondition of controlling the charging cabinet door drive motors corresponded to multiple charging cabinets not having mobile power supplies to rotate forward is: when there are multiple mobile power supplies to be returned). The charging cabinet drive motor 27 opens the charging cabinet door, and meanwhile the charging cabinet door sensor 28 judges the open/close state of the charging cabinet door. If the charging cabinet door is opened normally, the charging cabinet motion drive motor will be controlled to rotate reversely, and the charging cabinet motion drive motor will transfer the mobile power supply into the charging cabinet. At last, the charging cabinet door drive motor 27 is controlled to rotate reversely. The charging cabinet door drive motor 27 closes the charging cabinet door. At this time, the charging cabinet door sensor 28 judges an open/close state of the charging cabinet door. If the charging cabinet door is not closed successfully, the terminal will repeat the step of closing until the charging cabinet door is closed.

Embodiment 3

Figure 3:
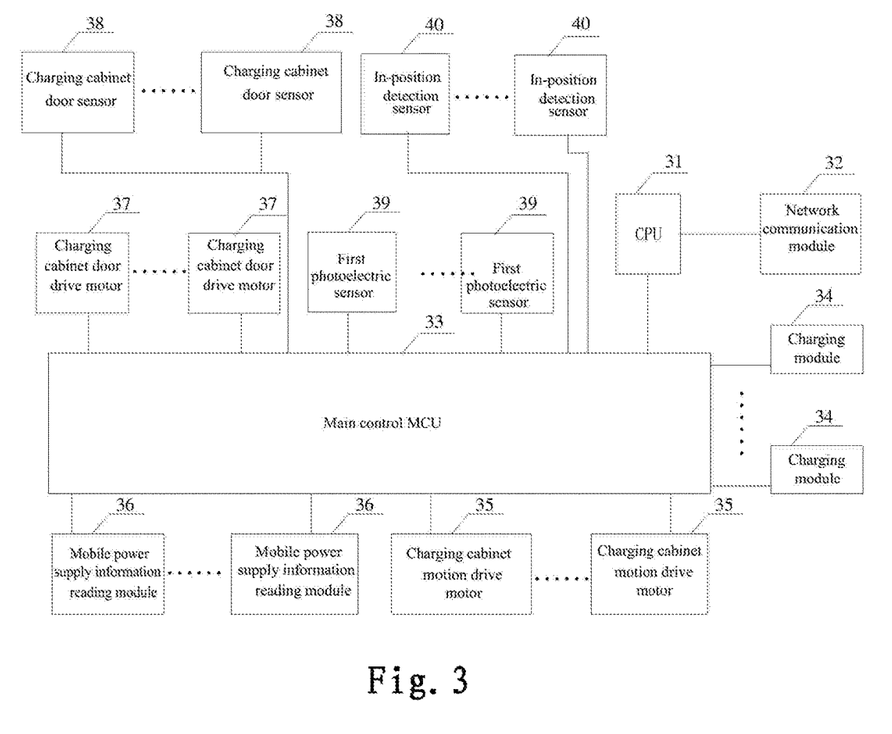
FIG. 3 is a structural diagram of a leasing terminal of a mobile power supply provided in embodiment 3 of the present invention.

With reference to FIG. 3, the leasing terminal of the mobile power supply provided in embodiment 3 of the present invention includes a CPU 31, a network communication module 32 and a main control MCU 33 which are respectively connected to the CPU 31, and at least one charging module 34, at least one charging cabinet motion drive motor 35, at least one mobile power supply information reading module 36, at least one charging cabinet door drive motor 37, at least one charging cabinet door sensor 38, at least one first photoelectric sensor 39 and at least one in-position detection sensor 40 which are respectively connected to the main control MCU 33.

Wherein, the charging modules 34, charging cabinet motion drive motors 35, mobile power supply information reading modules 36, charging cabinet door drive motors 37, charging cabinet door sensors 38, first photoelectric sensors 39 and in-position detection sensors 40 are of equal number. Each charging cabinet corresponds to one charging module 34, one charging cabinet motion drive motor 35, one mobile power supply information reading module 36, one charging cabinet door drive motor 37, one charging cabinet door sensor 38, one first photoelectric sensor 39 and one in-position detection sensor 40. The charging cabinet motion drive motor 35 and charging cabinet door drive motor 37 may be stepper motors which can control the motor rotational speed and distance precisely by means of software control. This may reduce mechanical impact, reduce failure and lengthen service life.

The leasing terminal of the mobile power supply provided in embodiment 3 of the present invention differs from the leasing terminals of the mobile power supply provided in Embodiment 1 and embodiment 2 of the present invention mainly in that the leasing terminal of the mobile power supply provided in embodiment 3 of the present invention also includes at least one first photoelectric sensor 39 and at least one in-position detection sensor 40. In the leasing terminal of the mobile power supply provided in embodiment 3 of the present invention, the main control MCU 33 is used for generating a charging management control instruction for controlling the charging module 34 to charge the mobile power supply in the charging cabinet, and is also used for generating a leasing control instruction to control forward and reverse rotations of the charging cabinet motion drive motor 35 and the charging cabinet door drive motor 37, and is also used for acquiring information relevant to the mobile power supply from the mobile power supply information reading module 36, and is also used for acquiring, from the first photoelectric sensor 39, information about whether the mobile power supply is in the charging cabinet, and acquiring, from the in-position detection sensor 40, information about whether the mobile power supply has been transferred to the charging position. The first photoelectric sensor 39 is used for judging whether the mobile power supply is in the charging cabinet. The in-position detection sensor 40 is used for judging whether the mobile power supply has been transferred to the charging position.

In embodiment 3 of the present invention, the leasing terminal of the mobile power supply may also include two first photoelectric sensors connected with the main control MCU, each charging cabinet corresponding to two first photoelectric sensors, wherein one first photoelectric sensor is used for judging whether or not the mobile power supply is located at the charging cabinet door, and the other first photoelectric sensor is used for judging whether or not the mobile power supply has been taken away; the main control MCU is also used for obtaining, from the two first photoelectric sensors, information about whether the mobile power supply is located at the charging cabinet door and information about whether the mobile power supply has been taken away.

When the user wants to borrow or return a mobile power supply, the main control MCU generates a corresponding control instruction of borrowing or returning the mobile power supply, then the main control MCU obtains, from the first photoelectric sensor, information about whether the mobile power supply is in the charging cabinet, and when what generated is a control instruction of borrowing the mobile power supply, the main control MCU controls the motor corresponded to one of charging cabinets having mobile power supply(s) to perform corresponding operations, and when what generated is a control instruction of returning the mobile power supply, the main control MCU controls a motor corresponded to one of the charging cabinets not having mobile power supplies to perform corresponding operations.

When the user wants to return the mobile power supply, the charging cabinet motion drive motor transfers the mobile power supply into the charging cabinet, then the in-position detection sensor judges whether the mobile power supply has been transferred to the charging position, and if it has been transferred to the charging position, the main control MCU controls the charging cabinet door drive motor to rotate reversely, and the charging cabinet door drive motor closes the charging cabinet door.

Embodiment 4

Figure 4:
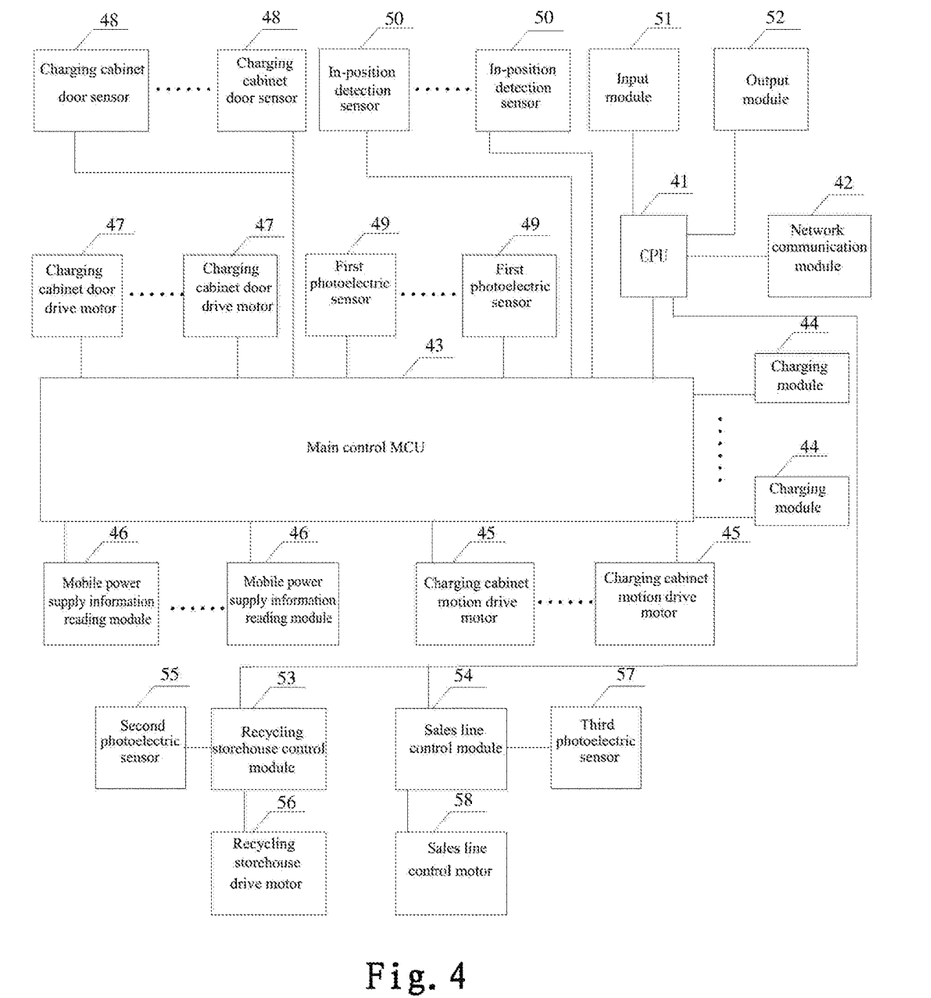
FIG. 4 is a structural diagram of a leasing terminal of a mobile power supply provided in embodiment 4 of the present invention.

With reference to FIG. 4, the leasing terminal of the mobile power supply provided in embodiment 4 of the present invention includes a CPU 41, a network communication module 42 and a main control MCU 43 which are respectively connected to the CPU 41, and at least one charging module 44, at least one charging cabinet motion drive motor 45, at least one mobile power supply information reading module 46, at least one charging cabinet door drive motor 47, at least one charging cabinet door sensor 48, at least one first photoelectric sensor 49 and at least one in-position detection sensor 50 which are respectively connected to the main control MCU 43. The releasing terminal of the mobile power supply also includes an input module 51, an output module 52, a recycling storehouse control module 53 and at least one sales line control module 54 which are respectively connected with the CPU 41. The input module 51 may be a touch screen or a keyboard. The output module 52 may be a speaker and/or a display. The leasing terminal of the mobile power supply also includes a second photoelectric sensor 55 and a recycling storehouse door drive motor 56 which are respectively connected with the recycling storehouse control module 53. The leasing terminal of the mobile power supply also includes a third photoelectric sensor 57 and a sales line control motor 58 which are respectively connected with the sales line control module 54.

The charging cabinet motion drive motor 45, the charging cabinet door drive motor 47, the recycling storehouse door drive motor 56 and the sales line control motor 58 may be stepper motors, which can control the motor rotational speed and distance precisely by means of software control. This may reduce mechanical impact, reduce failure and lengthen service life.

The leasing terminal of the mobile power supply provided in embodiment 4 of the present invention differs from the leasing terminal of the mobile power supply provided in embodiment 3 of the present invention mainly in that the leasing terminal of the mobile power supply provided by embodiment 4 of the present invention also includes an input module 51, an output module 52, a recycling storehouse control module 53 and a sales line control module 54 which are respectively connected with the CPU 41. The input module 51 is used for inputting a return instruction, and is also used for after-sales maintenance. The output module 52 is used for outputting the identification number and/or prompt information of the leasing terminal of the mobile power supply. The CPU 41 is also used for transmitting a storehouse opening/closing instruction to the recycling storehouse control module 53, and is also used for transmitting a sales line instruction to the sales line control module 54. The storehouse opening/closing instruction may be input by an input module 51, or the recycling storehouse control module 53 may be controlled to generate a corresponding storehouse opening/closing instruction according to the storehouse opening/closing instruction received by the network communication module 42 from the cloud server. The sales line instruction may be input by the input module 51, or the sales line control module 54 may be controlled to generate a corresponding sales line instruction according to the sales line instruction received by network communication module 42 from the cloud server. The CPU 41 is also used for receiving information obtained by the recycling storehouse control module 53 from the second photoelectric sensor 55 and information obtained by the sales line control module 54 from the third photoelectric sensor 57 and feeding the information back to the cloud server via the network communication module 42. The recycling storehouse control module 53 is used for controlling forward and reverse rotations of the storehouse door drive motor 56, and is also used for acquiring, from the second photoelectric sensor 55, information about whether the mobile power supply has been put into the recycling storehouse. The recycling storehouse door drive motor 56 is used for opening or closing the recycling storehouse door. The second photoelectric sensor 55 is used for judging whether or not the mobile power supply has been put into the recycling storehouse, and is also used for counting the number of the mobile power supplies that have been put into the recycling storehouse. The sales line control module 54 is used for controlling the forward and reverse rotations of the sales line control motor 58, and is also used for obtaining, from the third photoelectric sensor 57, information about whether a data line stretches out. The third photoelectric sensor 57 is used for judging whether a data line stretches out.

The leasing terminal of the mobile power supply provided by embodiment 4 of the present invention may also include at least one sterilization module connected with the CPU for sterilizing the mobile power supply located in the charging cabinet, one sterilization module corresponding to one or more charging cabinets. The leasing terminal of the mobile power supply may also include a safety check module connected with the CPU, such as a smog sensor and an electric leakage switch, etc., used for checking whether the leasing terminal of the mobile power supply is safe.

The above content is only preferred embodiments of the present invention, but cannot be used for limiting this invention. Any modification, equivalent replacement and improvement, etc. within the spirit and principle of this invention shall be contained in the scope of protection of this invention.

We claim:

1. A leasing terminal of a mobile power supply, comprising:
a CPU, a network communication module and a main control MCU which are respectively connected to the CPU, and at least one charging module, at least one charging cabinet motion member and at least one mobile power supply information reading module which are respectively connected to the main control MCU;
wherein each charging cabinet corresponds to one charging module, one charging cabinet motion drive member and one mobile power supply information reading module;
wherein the CPU is used for controlling the main control MCU to generate a corresponding leasing control instruction according to a leasing instruction received by the network communication module from a cloud server, and is also used for controlling the main control MCU to generate a charging management control instruction, and is also used for receiving information obtained by the main control MCU and feeding the information back to the cloud server via the network communication module;

wherein the main control MCU is used for generating the charging management control instruction for controlling the charging module to charge the mobile power supply in the charging cabinet, and is also used for generating the leasing control instruction to control motions of the charging cabinet motion member, and is also used for acquiring information relevant to the mobile power supply from the mobile power supply information reading module;

wherein the charging module is used for charging the mobile power supply in the charging cabinet;

wherein the charging cabinet motion member is used for enabling transferring the mobile power supply into or out of the charging cabinet by the motions of the charging cabinet motion member; and wherein the mobile power supply information reading module is used for reading the information relevant to the mobile power supply connected thereto.

2. The leasing terminal according to claim 1, wherein the charging cabinet motion member comprises a charging cabinet motion drive member, and the charging management control instruction controls motions of the charging cabinet motion member by controlling motions of the charging cabinet motion drive member.

3. The leasing terminal according to claim 2, wherein the charging cabinet motion drive member comprises a charging cabinet motion drive motor, and motions of the charging cabinet motion drive motor comprise forward and reverse rotations of the charging cabinet motion drive motor.

4. The leasing terminal according to claim 1, wherein the leasing terminal further includes at least one charging cabinet door drive motor connected with the main control MCU, each charging cabinet corresponding to a charging cabinet door drive motor;

wherein the main control MCU is also used for generating a leasing control instruction to control the forward and reverse rotations of the charging cabinet door drive motor; and wherein the charging cabinet door drive motor is used for opening and closing the charging cabinet door.

5. The leasing terminal according to claim 4, wherein the leasing terminal also includes at least one charging cabinet door sensor connected with the main control MCU, each charging cabinet corresponding to one charging cabinet door sensor;

wherein the charging cabinet door sensor is used for determining an open/close state of a charging cabinet door; and wherein the main control MCU is also used for acquiring information of the open/close state of the charging cabinet door from the charging cabinet door sensor.

6. The leasing terminal according to claim 1, wherein the leasing terminal also includes at least one first photoelectric sensor connected to the main control MCU, each charging cabinet corresponding to one first photoelectric sensor;

wherein the first photoelectric sensor is used for determining whether or not the mobile power supply is in the charging cabinet; and wherein the main control MCU is also used for acquiring, from the first photoelectric sensor, information about whether the mobile power supply is in the charging cabinet.

7. The leasing terminal according to claim 1, wherein the leasing terminal also includes two first photoelectric sensors connected with the main control MCU, each charging cabinet corresponding to two first photoelectric sensors, wherein one first photoelectric sensor is used for determining whether or not the mobile power supply is located at the charging cabinet door, and the other first photoelectric sensor is used for determining whether or not the mobile power supply has been taken away; and wherein the main control MCU is also used for obtaining, from the two first photoelectric sensors, information about whether the mobile power supply is located at the charging cabinet door and information about whether the mobile power supply has been taken away.

8. The leasing terminal according to claim 1, wherein the leasing terminal also includes at least one in-position detection sensor connected to the main control MCU, each charging cabinet corresponding to one in-position detection sensor;

wherein the in-position detection sensor is used for determining whether the mobile power supply has been transferred to the charging position; and wherein the main control MCU is also used for acquiring, from the in-position detection sensor, information about whether the mobile power supply has been transferred to the charging position.

9. The leasing terminal according to claim 1, wherein the leasing terminal also includes an input module connected with the CPU, the input module is used for inputting a return instruction.

10. The leasing terminal according to claim 1, wherein the leasing terminal also includes an output module connected with the CPU, the output module is used for outputting an identification number and/or prompt information of the leasing terminal of the mobile power supply.

11. The leasing terminal according to claim 1, wherein the leasing terminal also includes a recycling storehouse control module connected with the CPU, and a second photoelectric sensor and a recycling storehouse door drive motor which are respectively connected to the recycling storehouse control module;

wherein the recycling storehouse control module is used for controlling forward and reverse rotations of the recycling storehouse door drive motor, and is also used for acquiring, from the second photoelectric sensor, information about whether the mobile power supply has been put into the recycling storehouse;

wherein the recycling storehouse door drive motor is used for opening or closing the recycling storehouse door;

the second photoelectric sensor is used for determining whether the mobile power supply has been put into the recycling storehouse; and wherein the CPU is also used for transmitting a storehouse opening or closing instruction to the recycling storehouse control module, and is also used for receiving information obtained by the recycling storehouse control module from the second photoelectric sensor and feeding back the information to the cloud server via the network communication module.

12. The leasing terminal according to claim 1, wherein the leasing terminal also includes at least one sales line control module connected with the CPU, and a third photoelectric sensor and a sales line control motor which are respectively connected to the sales line control module;
  wherein the sales line control module is used for controlling forward and reverse rotations of the sales line control motor, and is also used for obtaining, from the third photoelectric sensor, information about whether a data line stretches out;
  wherein the third photoelectric sensor is used for determining whether or not the data line stretches out; and
  wherein the CPU is also used for transmitting a sales line instruction to the sales line control module, and is also used for receiving information obtained by the sales line control module from the third photoelectric sensor and feeding back the information to the cloud server via the network communication module.

13. The leasing terminal according to claim 1, wherein the leasing terminal also includes at least one sterilization module connected with the CPU, one sterilization module corresponding to one or more charging cabinets.

14. The leasing terminal according to claim 1, wherein the leasing instruction is sent by an APP on a cell phone to the cloud server.

* * * * *